Figure 1:
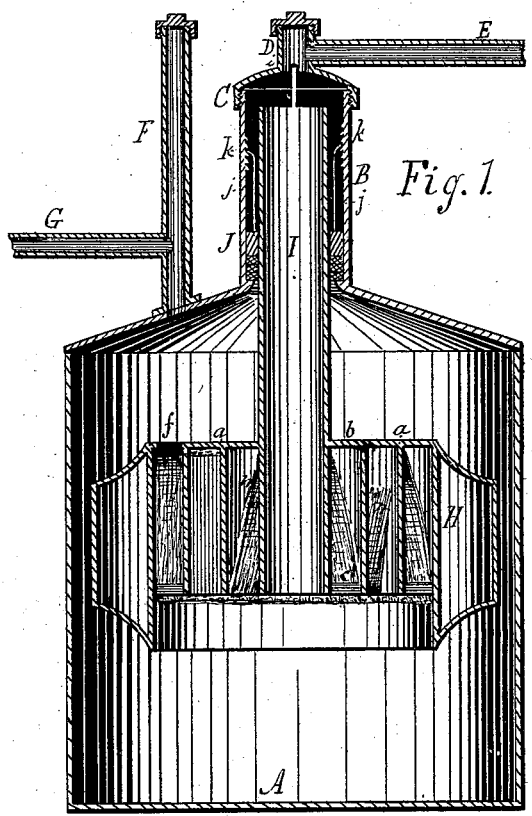
Figure 2:
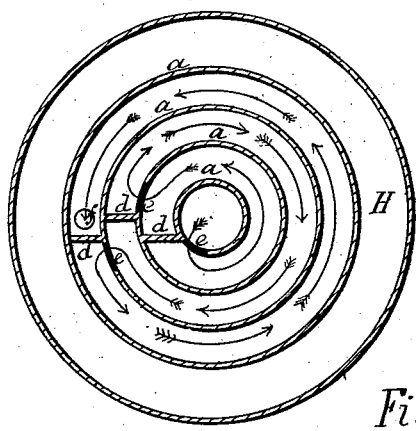
Figure 3:
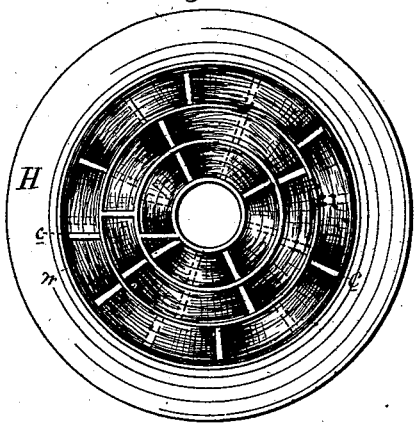
Figure 4:
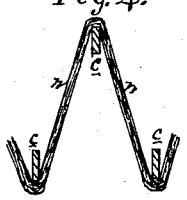

(No Model.)

B. RADKEY.
Carbureter.

No. 230,656. Patented Aug. 3, 1880.

WITNESSES
A. B. Robertson
Wm Turner

INVENTOR
Bernard Radkey,
per T. J. W. Robertson
ATTORNEY